United States Patent [19]

Furnish

[11] Patent Number: 4,896,855
[45] Date of Patent: Jan. 30, 1990

[54] PIVOTAL WINDSHIELD MOUNT

[75] Inventor: Gregory Furnish, Cincinnati, Ohio

[73] Assignee: Cincinnati Microwave, Inc., Cincinnati, Ohio

[21] Appl. No.: 274,002

[22] Filed: Nov. 21, 1988

[51] Int. Cl.⁴ ............................................. F16B 47/00
[52] U.S. Cl. ................................ 248/206.3; 248/291
[58] Field of Search ............... 248/205.5, 206.2, 206.3, 248/278, 284, 286, 291, 293

[56] References Cited

U.S. PATENT DOCUMENTS

| | | |
|---|---|---|
| 83,967 | 11/1868 | Horrell . |
| 967,627 | 8/1910 | Florsheim . |
| 1,384,727 | 7/1921 | Hutcheson . |
| 1,468,197 | 9/1923 | Downing . |
| 1,478,216 | 12/1923 | Gilbody . |
| 1,483,640 | 2/1924 | Manning . |
| 1,531,694 | 3/1925 | Downing . |
| 1,595,987 | 8/1926 | Bennett . |
| 1,632,856 | 6/1927 | Running . |
| 1,799,445 | 4/1931 | Stansberry . |
| 1,849,338 | 3/1932 | Stansberry . |
| 1,852,599 | 4/1932 | Zaiger et al. . |
| 2,165,814 | 7/1939 | Redmond . |
| 2,200,674 | 5/1940 | McDonald, Jr. . |
| 2,250,387 | 7/1941 | McDonald, Jr. . |
| 2,251,348 | 8/1941 | Zimmer ................................ 248/293 |
| 2,271,769 | 2/1942 | Kieft . |
| 2,353,671 | 7/1944 | Karish . |
| 2,392,091 | 1/1946 | Kieft . |
| 2,468,435 | 4/1949 | Epp . |
| 2,557,434 | 6/1951 | Hoverder . |
| 2,619,673 | 12/1952 | Evans . |
| 2,650,870 | 9/1953 | Carpenter . |
| 2,863,466 | 12/1958 | Small . |
| 2,980,379 | 4/1961 | Goldfus . |
| 3,007,435 | 11/1961 | Peterson . |
| 3,131,755 | 5/1964 | Francis . |
| 3,229,945 | 1/1966 | Hartman ................................ 248/286 |
| 3,722,393 | 3/1973 | Drevitch ........................ 248/291 X |
| 3,847,316 | 11/1974 | McInnes . |
| 3,918,666 | 11/1975 | Florian . |
| 4,010,697 | 3/1977 | Einhorn ........................... 248/250 X |
| 4,079,987 | 3/1978 | Bumgardner . |
| 4,244,550 | 1/1981 | Yamada ........................ 248/316.7 X |
| 4,376,521 | 3/1983 | Walters . |
| 4,648,572 | 3/1987 | Sokol ............................ 248/205.2 X |
| 4,807,935 | 2/1989 | King ................................ 248/291 X |

FOREIGN PATENT DOCUMENTS

| | | |
|---|---|---|
| 547946 | 11/1958 | Italy . |
| 58-101316 | 6/1983 | Japan .................................... 248/291 |

OTHER PUBLICATIONS

Cincinnati Microwave Owner's Manual For Radar Detector Windshield Mount; pp. 8–10.
Electrolert, Inc.; "Radar Detector Accessories" Advertisement; Jun. 1, 1977.
Soleil, Inc.; "Adjustable Radar Detector Bracket" Advertisement.

Primary Examiner—Ramon S. Britts
Assistant Examiner—D. J. Hulseberg
Attorney, Agent, or Firm—Wood, Herron & Evans

[57] ABSTRACT

An adjustable angle mount particularly useful for removably supporting a police radar detector horizontally to the inside of any of a variety of vehicle windshields of various inclination angles. The mount has a pair of planar members hinged together at a horizontal axis, one member being attachable to the windshield by two horizontally spaced suction cups and with a third windshield contact point. Below the axis is a bearing surface against which a cam pinned to the other member bears, under the weight of a receiver removably supported thereon, to limit the angle between said members and support the receiver horizontally. The cam is rotatable by a driver accessible lever formed integrally of the cam.

22 Claims, 2 Drawing Sheets

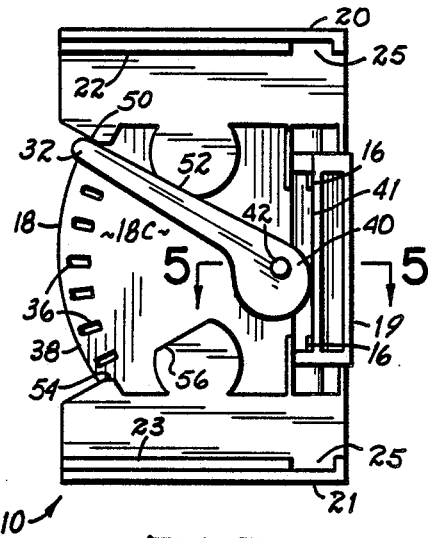
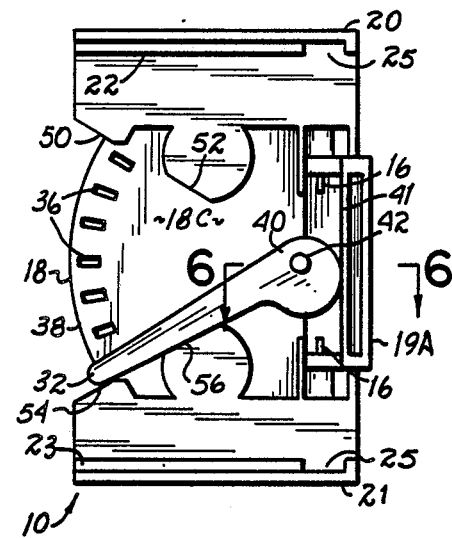
FIG. 3
FIG. 4
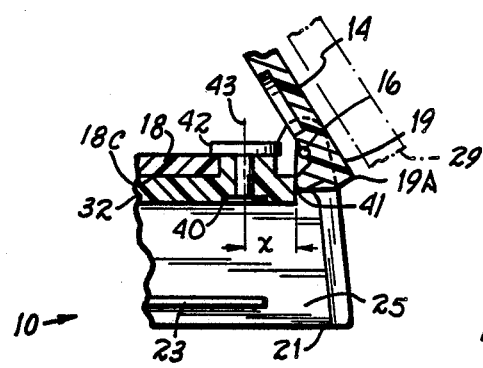
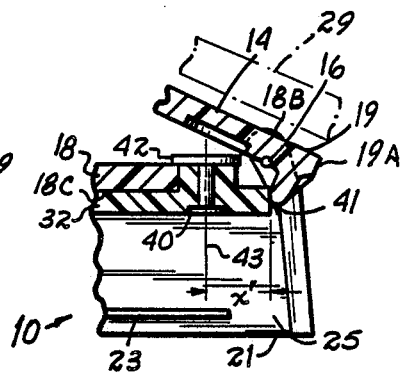
FIG. 5
FIG. 6

PIVOTAL WINDSHIELD MOUNT

The present invention relates to adjustable mounting brackets, and more particularly to a pivotally adjustable windshield mount for securing devices such as police radar receivers and the like to the inside surface of an automobile windshield.

BACKGROUND OF THE INVENTION

Police radar receivers are devices for receiving and detecting microwave radiation from police radar units and providing an early indication of the presence of such radiation to the operators of motor vehicles on the highways. Such receivers operate better in most situations if mounted high on the vehicle. If mounted within the vehicle, they should be positioned behind the windshield such that their antennas are unobstructed by materials opaque to microwave radiation. Accordingly, it is usually desirable that they be installed within the vehicle, at or above the dashboard level, and high on the windshield or on the automobile visor behind the windshield glass.

For more reliable operation, such receivers should also be maintained in a horizontal orientation with their front ends which contain the antenna structure directed forwardly along the roadway in the direction of travel, and with the opposite end of the receiver containing the controls facing rearwardly with the controls accessible to and in the view of the operator of the vehicle. Radar receivers so positioned are visible from the exterior of the vehicle, and are subject to theft. Accordingly, it is desirable that radar receiver mounts be provided with means for easy removal of the receiver from the vicinity of the automobile windshield so that they can be removed from the vehicle or otherwise concealed when the operator leaves the vehicle.

Removal of the receiver while leaving the bracket in view may still invite a break-in, since thieves know the receiver is often hidden within the vehicle. Therefore, easy removability of the mounting bracket from its point of attachment to the vehicle is also desirable. Where this is done in the prior art, such brackets, unless detached from the receiver also, undesirably increase the bulk of the receiver and render the receiver too awkward for the driver to conveniently carry away.

Brackets have been devised for supporting police radar receivers on the inside surface of an automobile windshield. Passenger automobiles and other such vehicles today, however, are equipped with windshields of varying configurations and slopes. Windshield-mounted brackets for supporting such receivers have in the prior art been equipped with suction cups or other means for adhering brackets to the inside surfaces of windshields. Because of the varying slopes encountered, such brackets are not always suitable or easily adaptable to support a receiver at the desired angle of inclination to the windshield and maintain it in a horizontal or other desirable inclination. Devices of the prior art have been less than fully satisfactory in adapting to varying windshield angles and, to the extent that they have been provided with means for varying the angles of inclination, have been less than fully satisfactory in doing so.

SUMMARY OF THE INVENTION

It has been a principal objective of the present invention to provide a windshield mount for a police radar receiver which is adjustable to accommodate various angles of windshield inclination. More particularly, it is an objective of the present invention to provide a windshield mounting bracket for supporting a police radar receiver which can be easily adhered to the inside of a windshield, which will removably support a radar detector, and which readily accommodates varying angles of windshield inclination. Additionally, it is an objective of the present invention to provide a police radar receiver windshield mount which is easily removable from the windshield along with the radar receiver, but which will not greatly increase the size of even the smallest receiver to which it may be attached. It is a further objective of the present invention to provide a windshield mount for a radar detector which is foldable when removed from the windshield, but which, when folded, retains the angular adjustment.

According to the principles of the present invention, a windshield mount is provided having two hingedly connected members, the first being removably securable to the inside surface of a vehicle windshield and the second being detachably connectable to a police radar receiver. According to more particular principles of the present invention, one of the members is provided with a rotatable cam which bears against a cam surface on the other member to restrict the downward pivotal movement of the receiver-supporting member about the hinged connection, and to thereby maintain the angle of inclination of the receiver in a horizontal orientation or at some other desired angle with respect to the angle windshield. Preferably, the member secured to the windshield folds flat against the receiver when the mount and receiver are removed as a unit from the windshield along with the radar receiver, and does so without changing the adjustment of the cam, thus making the entire receiver/mount assembly quite compact for storage purposes, and capable of being remounted to the windshield without the need to reset the cam.

The preferred embodiment of the present invention includes a mount having two generally, planar panels hingedly connected together along respective confronting edges, the first being securable to the inside of a windshield with suction cups and the second being detachably engagable through a snap-on connection with the casing of the police radar receiver unit. On the receiver supporting panel is provided a horizontally disposed, eccentrically pivotally mounted cam having a lever for moving the cam about a vertical axis to a plurality of angular positions. The cam positions are discreetly differentiated by notches on the receiver supporting panel which are selectively engagable with a detent on the cam lever. As the lever moves the cam to its different angular positions, different sections of the cam edge, located at differing radial distances from the same pivot point, bear against a shoulder on the windshield mounted panel located proximate to the hinge connection. The cam and shoulder cooperate to regulate the distance between a pivot pin by which the cam is attached to the receiver-supporting panel and the shoulder of the windshield mountable panel. This distance, in turn, limits the furthest downward angle that the receiver support panel can move, under the weight of the receiver, with respect to the windshield attached panel and thereby controls the angle of the supported receiver with respect to the windshield, and thus controls the angle of inclination of the supported receiver relative to the horizontal. In addition, since the cam preferably constrains the setting of only the maximum angle, the mount can be folded flat without destroying its angular setting.

The specific embodiment of the present invention and the variations thereof to which the claims are directed accomplish the objectives set forth above and in doing so provide advantages so sought which have not been provided by the prior art. These and other unique objectives and advantages of the present invention will be more readily apparent from the following detailed description of the drawings in which:

BRIEF DESCRIPTION OF THE DRAWINGS

FIG. 3 is a bottom view of the adjustable windshield mount of FIG. 1 shown mounted on a windshield of a maximum expected angle of inclination and adjusted for horizontally supporting a police radar receiver thereon.

FIG. 4 is a bottom view similar to FIG. 3 and showing the mount of FIG. 1 mounted to a windshield of a minimum expected angle of inclination and adjusted to support a receiver horizontally thereon.

FIG. 5 is a cross-sectional view of the windshield mount taken along line 5—5 of FIG. 3.

FIG. 6 is a cross-sectional view of the windshield mount taken along line 6—6 of FIG. 4.

DESCRIPTION OF THE PREFERRED EMBODIMENTS

Figure 1:
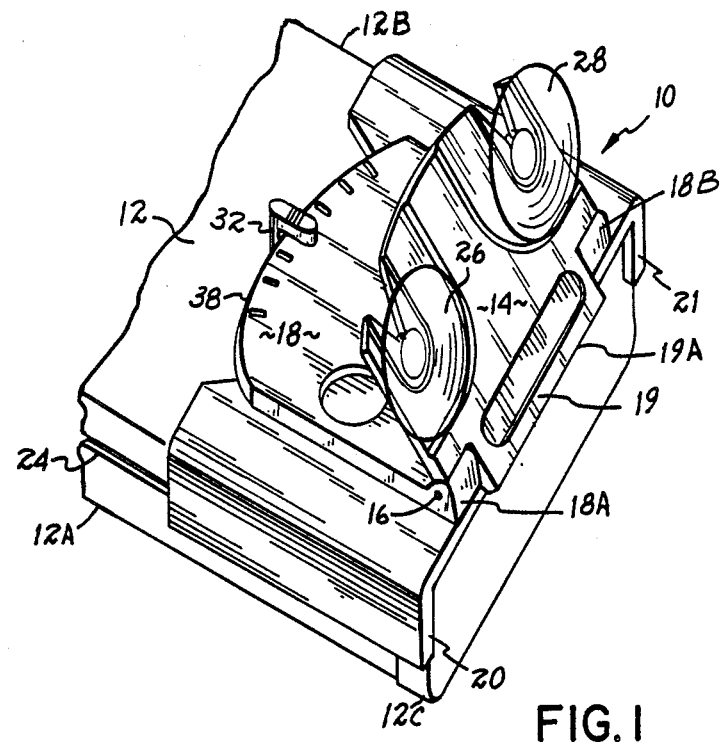
FIG. 1 is a perspective view view of an adjustable windshield mount according to principles of the present invention shown supporting a police radar receiver partially broken away in the figure.

Referring to FIG. 1, an adjustable windshield mount 10 is shown supporting a police radar detector 12 shown only in part in FIG. 1, with a housing having sides 12A and 12B engaged to be supported by the mount 10. The front end of the receiver 12 has a housing end cap 12C. The mount 10 includes a first upper planar member or panel 14 pivotally hingedly connected through a pivot pin 16 to a second lower planar member or panel 18. The horizontal pivot pin 16 has a horizontal axis parallel to the planes of the members 14 and 18, and connects the upper member 14 near its lower edge to the forward edge of the lower member 18. More particularly, the forward portion of panel 18 has a pair of upstanding ears 18A and 18B between which fits a central tongue 19 extending from the forward portion of the upper panel 14. The tongue 19 has a horizontal supporting edge 19A on the front side thereof. The hinge pin 16 extends through the ears 18A and 18B and the tongue 19 to hingedly connect the panels 14 and 18 at their respective forward margins or edge regions. For purposes of description, the terms "forward" or "front" refer to the direction toward the front of the vehicle and the terms "rearward" or "rear" or "back" refer to the direction or side toward the rear or back of the vehicle.

Referring now also to FIGS. 2-6, rigidly attached to opposite edges of the bottom surface 18C of the bottom member 18 are a pair of downwardly extending resilient opposed receiver supporting legs 20 and 21, each having near its lower edge a raised inwardly facing horizontal rail 22 and 23, respectively, which clips into notches 24 formed horizontally in the sides 12A and 12B of the housing, of the receiver 12. The horizontal rails 22 and 23 each have a notch 25 adjacent their forward ends to receive a portion of the receiver front end cap 12C to prevent the receiver 12 from sliding out of the mount 10 or against the windshield. As such, the receiver 12 can be easily snapped into and out of position between the opposed legs 20 and 21 depending from the the planar member 18.

The upper member 14 is provided with a pair of forwardly facing and laterally spaced suction cups 26 and 28. The suction cups 26 and 28 are adapted to attach the upper member 14 to the inside of a vehicle windshield 29. The horizontal supporting edge 19A of the forwardly extending tongue 19 of the bracket panel 14 rests against the inside of the windshield 29 and, in cooperation with the suction cups 26 and 28, resists the bending moment exerted by the weight of the receiver 12 to provide a cantilever support for the receiver and to stabilize the angle of inclination of the upper member 14 when the mount is secured to the windshield 29. While more or fewer suction cups than two may be used, two spaced horizontally are preferred in order to limit undesired oscillatory pivotal motion of the upper panel 14 about an axis perpendicular to the windshield 29 or in the horizontal plane. In embodiments where one cup is used, either a horizontally elongated cup or a lower edge or other such structure having more than one point of contact with the windshield will provide at least the minimum required stable cantilevered support.

Easy setting of the angle of inclination of the receiver 10 is accomplished by a person who is driving the vehicle by operation of a cam operating lever 32. Lever 32 has a small detent 34 thereon (FIG. 2) for setting the lever 32 in any one of a plurality of notches 36 in the lower panel member 18 near the rear edge 38 of the lower panel member.

A cooperating eccentric cam 40 and cam follower 41 are provided in the mount 10 for affecting the adjustment of the angle between the members 14 and 18. Cam 40 is selectively angularly positionable through the movement of the cam operating lever 32.

Figure 2:
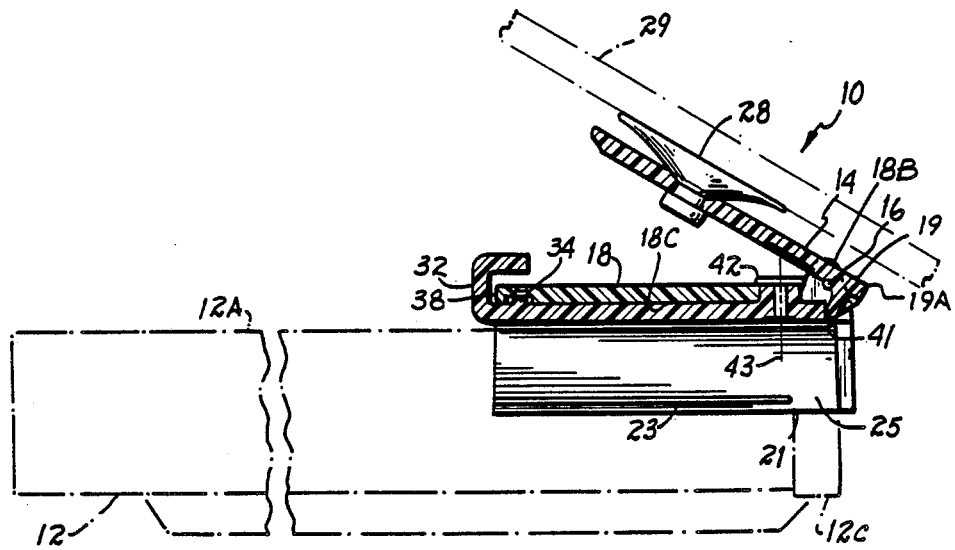
FIG. 2 is a plan view, partially in cross section illustrating an adjustable windshield mount of FIG. 1 and shown supporting a police radar receiver upon an automobile windshield, the receiver and the windshield being illustrated in phantom in the figure.

The lever 32 can be better seen by reference to FIG. 2, while the relationship of the cam 40 and cam follower 41 can be best understood by reference to FIGS. 3-6.

Referring to FIG. 2, the cam 40 is seen to be integrally formed with the lever 32 and eccentrically pivotally attached through pivot pin 42 to the underside of the member 18. The cam 40 and lever 32 are thus connected to the underside of the lower panel member 18 so as to pivotally move about an axis 43 perpendicular to the lower panel member and in a plane parallel thereto to a plurality of positions defined by the coincidence of the detent 34 with one of the plurality of notches 36 near the rear edge 38 of the lower panel member.

The upper panel member 14 is shown in FIG. 2 secured by the adhesive force of the suction cups 26 and 28 to the inside of a windshield 29 shown in phantom. Below the imaginary horizontal line on which the two suction cups 26 and 28 lie, the forward edge 19A of the tongue 19 bears against the inside of the inside windshield 29. Accordingly, the upper panel member 14 forms a three point contact with the suction cups 26, 28 and the forward tongue edge 19A against the windshield 29. At the lower edge of the panel 14 opposite the support surface 19 is the cam follower or bearing surface 41. The cam follower 41 is in the form of a ridge or shoulder formed integrally with tongue 19 and extending downwardly therefrom parallel to edge 19A.

Against the bearing surface 41 rests the cam 40, limiting the minimum distance between the axis 43 of the cam-mounting pin 42 and the cam follower surface 41, thus defining the maximum acute angle between the panel members 14 and 18, and approximately defining the angle at which the police radar receiver 12 will be supported under the weight of the receiver which acts downwardly through the legs 20 and 21 on the member 18. The manner in which the receiver angle is maintained and adjustable can be better illustrated by reference to FIGS. 3–6.

The cam follower or bearing surface 41 preferably faces toward the cam axis 43, and merely bears against the cam 40 under the weight of the receiver 12 limiting the angle only in one direction. This provides a simple structure, permitting the mount 10 to fold flat when removed from the windshield 29 regardless of the position of the lever, thus retaining the angle of adjustment. Accordingly, while the cam follower 41 can be of a pin and groove type, holding it to the cam surface, that is a less desirable arrangement where ease in folding the mount is most desired.

Referring to FIGS. 3 and 5, the cam 40 is shown bearing against the bearing surface 41 of the upper panel 14 limiting the distance X between the axis 43 of the cam pivot pin 42 and the bearing surface 41 on the upper panel 14. The angle between panels 14 and 18 is controlled by the position of the lever arm 32. In the lever position, shown in FIG. 3, the arm 32 rests against stops 50 and 52 on the bracket 20 causing distance X to be at a minimum. As such, the angle of inclination of the lower member 18 with respect to that of upper panel 14 is, in FIGS. 3 and 5, at a maximum permissible angle and accordingly, the horizontal orientation of the member 18 and the receiver 12 are thereby maintained when the windshield 29 to which the support 14 is attached is at the least inclined or most vertical expected angle of inclination. At the other extreme, shown in FIG. 4 with lever 32 against stops 54 and 56, the distance X' is maximized, the angle of the windshield 29 being at its most inclined of expected angles, and the angle between the lower lever 18 and the upper panel 14 are at a minimum, as seen in FIG. 6. At the maximum angle between the receiver 12 and the windshield 29 (FIG. 5), the lever 32 is moved fully to the driver's right and against stops 50 and 52 on the leg 20 (FIG. 3), while when the angle between the receiver 12 and the windshield 29 is at a minimum (FIG. 6), the lever 32 is moved fully to the driver's left and against stops 54 and 56 on the leg 21 (FIG. 4).

The above is a description of the preferred embodiment of the present invention. Those skilled in the art will readily appreciate that certain variations thereof are permissible and fall within the scope of the invention as set forth in the following claims.

Accordingly, what is claimed is:

1. A pivotal windshield mount for supporting a radar receiver at a desired angle of inclination to the horizontal upon the inside of a vehicle windshield comprising:
   a windshield mounting member having secured thereto at least one forwardly facing suction cup, said windshield mounting member being attachable to said windshield by said suction cup;
   receiver supporting member hingedly connected at one edge thereof to said windshield mounting member so as to rotate about a horizontal axis thereon; said receiver supporting member being securable to said receiver;
   a bracing surface on one of said members spaced from said horizontal axis; and
   an eccentric cam attached to the other of said members and rotatable about a cam pivot axis on said member, said cam rotatably mounted in abutting engagement with said bracing surface for rotation into selected different angular positions for maintaining the distance between said cam pivot axis and said bracing surface at selected different distances to maintain said receiver supporting member at selected different angles to support said receiver thereon at said desired angle over a range of windshield angles.

2. The mount of claim 1 further comprising:
   a lever connected to said cam for pivoting said cam to change said distance for setting said desired angle.

3. The mount of claim 1 further comprising at least two forwardly facing cups on said, windshield mounting member for attaching said windshield mounting member to said windshield.

4. The mount of claim 1 wherein said mount engages said windshield at at least three points, at least one of which is spaced vertically from the other two, at least one of which is spaced below said suction cup, and at least one of which is spaced horizontally from one of the other two.

5. The mount of claim 1 wherein said receiver supporting member is removably securable to said receiver.

6. The mount of claim 1 wherein said receiver mounting member is securable to said receiver such that it is approximately parallel thereto and said specified angle is approximately equal to said desired angle.

7. The mount of claim 1 wherein said bearing surface faces said cam axis.

8. The mount of claim 1 wherein said bearing surface is on said windshield mounting member and said cam is pivotally attached to said receiver supporting member.

9. The mount of claim 8 wherein said bearing surface faces said cam axis and is below said horizontal axis.

10. A mounting device for supporting an object at a desired angle of inclination upon an inclined mounting surface, said device comprising:
   means for supporting the object on the mounting surface, said supporting means including a first member and a second member;
   said first member including means for attaching said first member to the mounting surface;
   said second member including means for attaching said second member to the object, said second member being pivotally connected to said first member about a horizontal axis;
   means for adjusting the angle of inclination between the supported object and the mounting surface, said adjusting means including a cam and a bearing surface;
   one of said members having said bearing surface thereon spaced from said horizontal axis;
   the other of said members having said cam rotatably connected thereto at a cam axis on said other member, said cam having means associated therewith for setting said cam to one of a plurality of different angular positions on said other member;
   said cam being positioned on said other member so as to bear against said bearing surface when said second member is pivoted downwardly under the weight of said object to limit the pivoting of said second member with respect to said first member to an inclination angle determined by the angular position of said cam.

11. The mounting device of claim 10 wherein said cam is connected to said second member and said bearing surface is on said first member.

12. The device of claim 11 wherein said bearing surface is beneath said horizontal axis and faces said cam axis.

13. The device of claim 10 wherein said setting means comprises a lever.

14. The device of claim 13 wherein said lever is integrally formed with said cam.

15. The device of claim 13 wherein said setting means further comprises notch and detent means on said lever and second member for holding said cam at any one of a plurality of predefined angular positions.

16. The device of claim 10 wherein said first member is a planar member.

17. The device of claim 10 wherein said attaching means of said first member comprises a plurality of suction cups.

18. The device of claim 10 wherein said mounting surface is an automobile windshield.

19. The device of claim 18 wherein said attaching means on said first members includes at least one suction cup.

20. The device of claim 19 wherein said attachment means on said first member includes a pair of horizontally spaced suction cups.

21. The device of claim 10 wherein said second member is removably attachable to said object.

22. The device of claim 10 wherein said cam being configured with respect to said bearing surface so as to permit said second member to be pivoted upwardly without rotation of said cam from the position to which it has been set.

* * * * *